(12) United States Patent
Sukthankar et al.

(10) Patent No.: US 7,006,055 B2
(45) Date of Patent: Feb. 28, 2006

(54) WIRELESS MULTI-USER MULTI-PROJECTOR PRESENTATION SYSTEM

(75) Inventors: Rahul Sukthankar, Somerville, MA (US); Tat-Jen Cham, Singapore (SG); Gita R. Sukthankar, Somerville, MA (US); James M. Rehg, Arlington, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 545 days.

(21) Appl. No.: 09/997,419

(22) Filed: Nov. 29, 2001

(65) Prior Publication Data

US 2003/0098819 A1 May 29, 2003

(51) Int. Cl.
*G09G 5/00* (2006.01)
(52) U.S. Cl. ......................... 345/1.2; 345/2.3
(58) Field of Classification Search ................. 345/1.1, 345/1.2, 2.1, 2.2, 2.3, 730, 732, 753, 756; 348/744; 709/204, 200
See application file for complete search history.

(56) References Cited

U.S. PATENT DOCUMENTS

| | | | | |
|---|---|---|---|---|
| 5,204,768 | A | 4/1993 | Tsakiris et al. | 359/148 |
| 5,539,658 | A * | 7/1996 | McCullough | 345/730 |
| 5,668,566 | A | 9/1997 | Yen | 345/2 |
| 5,736,968 | A | 4/1998 | Tsakiris | 345/2 |
| 2002/0089489 | A1 * | 7/2002 | Carpenter | 345/158 |
| 2002/0196378 | A1 * | 12/2002 | Slobodin et al. | 348/744 |

OTHER PUBLICATIONS

Sukthankar, R., et al., "Dynamic Shadow Elimination for Multi-Projector Displays," (Compaq Computer Corporation, Cambridge Research Laboratory), Jun., 2001.

Jaynes, C., et al., "Dynamic Shadow Removal from Front Projection Displays," (Metaverse Lab, Dept. of Computer Science, University of Kentucky) Proceedings of IEEE Visualization 2001, Oct. 21-26, 2001.

Sukthankar, R., Smart projectors: Camera-Projector Systmes. [online], [retrieved Oct. 18, 2001]. Retrieved from the Internet http://ww-2.cs.cmu.edu/~rahuls/Research/Projector/.

* cited by examiner

*Primary Examiner*—Chanh Nguyen
(74) *Attorney, Agent, or Firm*—Richard P. Lange

(57) ABSTRACT

Media slides are often employed in conference sessions, meetings, lectures, and other interactive forums. The proliferation of laptops and handheld computers allows a speaker to present directly from the laptop by connecting to the projector at the conference site. Physically connecting and disconnecting each presenter's laptop to the projection apparatus, however, can be a clumsy and disruptive process, particularly since the presenters may be seated at various locations around the room. A wireless interface between a presentation server and a laptop in a multi-user multi-projector presentation system allows a media sequence from each media source to be displayed on a common display via the presentation server and the wireless interface. Presenters need not run or swap cables or other physical connections to switch media sources to the common display. The interface requires no software modification to the media source laptops and maintains independence between media sources and the server for security. The presentation server communicates with the media sources over the mouse port allowing innovative user interfaces, such as gesture recognition, to be employed for presentation control without additional software. Multiple projectors redundantly illuminate the display surface, dynamically eliminating shadows and other display artifacts when presenters walk between a projector and the screen. Distracting projected light cast on to the occluding presenters is automatically suppressed.

23 Claims, 9 Drawing Sheets

WIRELESS MULTI-USER MULTI-PROJECTOR PRESENTATION SYSTEM

BACKGROUND OF THE INVENTION

Conference sessions, meetings, lectures, and other interactive forums invariably involve presentation materials such as text and graphics on a common display medium such as a projector screen. Traditional presentations have included so-called "slide shows," consisting of optical transparencies illuminated by a projector onto a display medium. Current computing technology has enabled software applications for developing media slides, and specialized projectors capable of accepting the video output signal from a PC or laptop and projecting directly onto the display medium. The proliferation of laptops and handheld computers allows a presenter to develop a presentation on a laptop, for example, and present from the laptop by connecting directly to the projector at the conference site.

Often, a particular conference or meeting has several presenters, each with a laptop and corresponding presentation. Physically connecting and disconnecting each presenter's laptop to the projection apparatus can be a clumsy and disruptive process, particularly since the presenters may be seated at various locations around the room. Further, physically moving the projector around the room can have adverse effects on the presentation, due to presenter movement, uneven lighting, and projection angles. Consolidation of the multiple presentations onto a single machine requires advance coordination between the presenters, compatibility between presentation formats, and raises security concerns because of the need to interconnect the different machines.

SUMMARY OF THE INVENTION

A system and method for integrating and coordinating media presentations from multiple presenters via a wireless link includes a plurality of media sources, such as laptop, handheld, or desktop PCs, each having (i) a media sequence such as a slide presentation of frames, and (ii) a VGA or other video output for transmitting the media sequence. A respective presentation controller operable for wireless communication and responsive to the media source is connected to the VGA output of each media source. A central presentation server is operable for wireless communication with each of the presentation controllers for receiving each of the media sequences and for arbitrating among each of the received media sequences. One or more projectors are connected to the presentation server for coordinating and displaying each of the media sequences onto a common display medium or a projection screen.

The presentation data comprising each of the media sequences is transmitted from each of the media sources via the respective presentation controller to the presentation server over the wireless link. The presentation controllers each include a display sequencer for detecting changes to the currently transmitted frame. An additional frame or portion of a frame is selectively transmitted over the wireless link when the display sequencer detects a change in the current frame. In this manner, the presentation controller transmits to the presentation server only changes to the current frame, and need not maintain the bandwidth required for a real-time video stream. The wireless link may operate according to a predetermined protocol such as IEEE 802.15 or other protocol.

The presentation server arbitrates the media sequences from each of the media sources onto the common display. An operator controller receives signals from an operator console via a graphical user interface (GUI) for controlling the arbitration. The media sequences may be switched sequentially, interleaved with frames from other sequences, or tiled as a simultaneous display in response to the GUI.

A plurality of projectors is employed proximate to the common display, each of the projectors receiving the current media sequence frame from the presentation server. The brightness of the displayed image from each of the projectors is calibrated such that an aggregate displayed image on the common display has a consistent brightness. When the presenter interferes with one or more of the display paths from the projectors, thereby creating an obscured area on the displayed image, the presentation server recomputes the brightness from each of the projectors such that the resulting display intensity at the obscured portion remains substantially consistent with remaining portions of the displayed image. A camera captures the appearance of the displayed image and provides feedback to the presentation server to identify the obscured portion and adjust the brightness on a pixel level to reduce or eliminate the obscured area.

Each of the multiple projectors is disposed at a distinct location, and accordingly, each has a different angle and distance perspective to the common display. The presentation server computes display parameters, such as distance and angle distortion factors, for each projector corresponding to the appearance of the media on the common display. The presentation server computes the display parameters for each of the projectors such that the aggregate, overlapping image on the common display appears consistent. In this manner, the frames are displayed according to the display parameters, and are recomputed, based on the appearance of the media sequence on the common display, when a projector or the common display is moved. As a result, the presentation server maintains a consistent appearance of the displayed image and intended media sequence.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The wireless multi-user multi-projector presentation system employs a plurality of media sources, such as laptops, hand-held PCs, and desktop PCs, each containing media sequences for presentation onto a common display. Presenters, each having such a media source, gather in a meeting area or conference room with the common display. The media sequence from each media source may be displayed onto the common display via a presentation server in communication over a wireless link with each of the media sources. Presenters need not run or swap cables or other physical connections to switch between media sources for the common display. The presentation server controls and displays output through multiple projectors in a manner that reduces the appearance of obstructions as presenters present from different locations. The use of VGA output for transmission from the media sources to the presentation server maintains connectivity independence between different media sources, reducing security risks.

Figure 1:
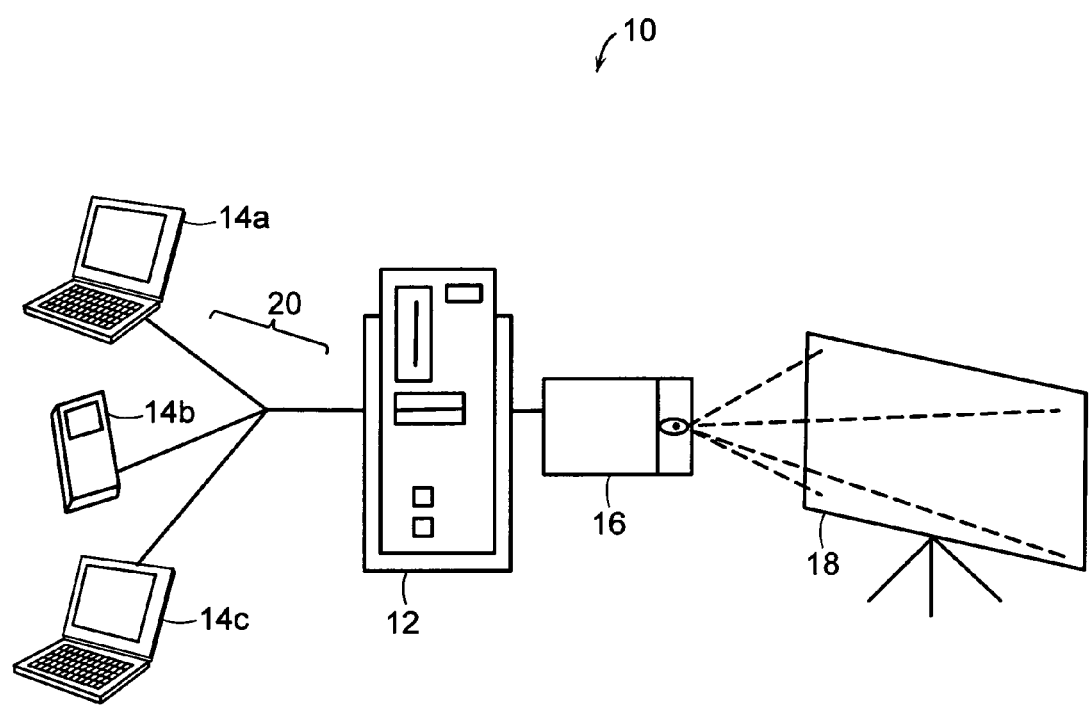
FIG. 1 is a schematic view of the wireless multi-user multi presentation system of the present invention.

FIG. 1 shows a context diagram of the invention as defined by the present claims. Referring to FIG. 1, the presentation system 10 includes a presentation server 12 connected to one or more projectors 16. A plurality of media sources 14a–14c (14 generally) may include laptop PCs, hand-held PCs, desktop PCs, or other sources, and communicate with the presentation server 12 via a wireless link 20. The presentation server 12 receives presentation data in the form of a media sequence of frames from the media sources 14, and arbitrates among the sequences to send to the projector 16 for displaying onto the common display 18. In this manner, multiple presenters, each having a respective media source 14n, may present in an integrated manner onto the common display 18 via the presentation server 12.

Figure 2:
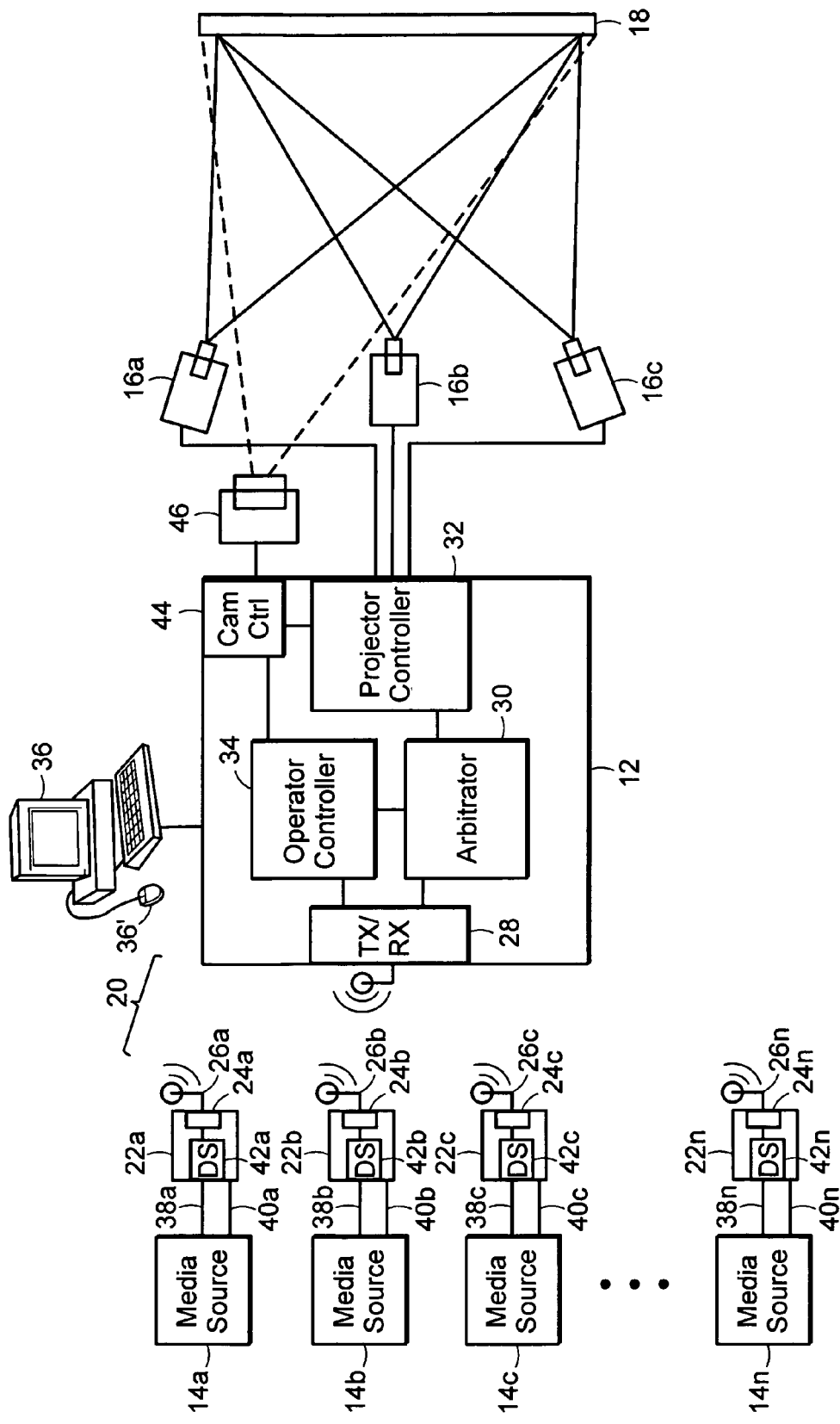
FIG. 2 is a block diagram of one embodiment of the invention as defined by the present claims.

FIG. 2 shows a block diagram of the presentation system. Referring to FIG. 2, a plurality of media sources 14a–14n is shown. Each of the media sources 14a–14n is connected to a respective presentation controller 22a–22n. The presentation controllers each include a wireless transceiver 24a–24n and antenna 26a–26n. The presentation server 12, likewise includes a wireless transceiver 28 to enable wireless communication between the presentation server 12 and the presentation controllers 22 via the wireless link 20.

Each of the media sources 14 is connected to the presentation controller via a VGA connection 38a–n, DVI (Digital Video Input), or other video connection and a mouse connection 40a–n. The VGA connection 38n is used to transmit a media sequence from the media source 14n to the presentation controller 22n. The mouse connection 40n is used to send control signals from the presentation server 12 to the media source 14n, both described further below. Each of the presentation controllers 22n also includes a display sequencer 42n for determining when to transmit additional frames from the media sequence, also described further below.

The presentation server 12 includes an arbitrator 30, a projector controller 32, and an operator controller 34. The arbitrator 30 is connected to the transmitter 28 for receiving each of the transmitted media sequences from the media sources 14n. The arbitrator 30 computes which media sequence or sequences to output for display, in response to the operator controller 34 and sends the sequence or sequences to the projector controller 32. The operator controller 34 receives operator input via a GUI (not shown) from the operator console 36, and is operable to direct the arbitrator 30 which media sequence or sequences to output for display.

The projector controller 32 is connected to each of the projectors 16a–16c in the example shown, and transmits the designated media sequence output by the arbitrator as display frames to each of the projectors 16n. The projector controller 32 also stores information about the location of each projector 16n relative to the common display 18, and augments the displayed image to compensate for distance and angle distortion, as will be described further below. The projector controller 32 is also connected to the camera controller 44, and receives image feedback for detecting and correcting intervening objects and shadows.

The camera controller 44 receives input from the camera 46, and provides GUI feedback from laser pointers and mouse control buttons, in addition to intervening object information captured by the camera 46.

Figure 3:
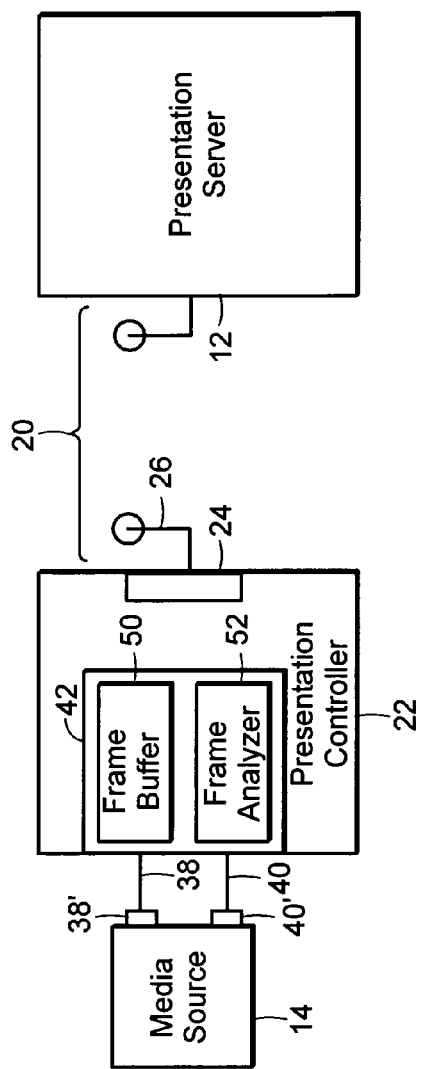
FIG. 3 is a block diagram of the wireless interface of the presentation system invention employed in FIG. 2.

FIG. 3 shows the wireless interface of the presentation system in more detail. Referring to FIG. 3, each media source 14 is connected to its respective presentation controller 22 over the VGA connection 38 via the VGA port 38', and by the mouse connection 40 via the mouse port 40', or other input such as keyboard or USB ports. The display sequencer 42 receives the media sequence in the form of frames of display information from the VGA connection 38. The display sequencer 42 further includes a frame buffer 50 and a frame analyzer 52. The frame buffer 50 maintains the current frame being transmitted to the presentation server 12, and the frame analyzer 52 examines new display information received over the VGA connection 38 from the media source 14, to determine when the frame has changed. Further, since the only external connections to the media source 14, typically the presenter's laptop, are the VGA 38 and mouse connections 40, no security implications are raised by direct connections to other machines or networks.

A typical media sequence includes a series of frames, or slides, which are displayed sequentially by the presenter. Each frame is typically addressed by the presenter for a brief period before advancing to the next frame. Further, a successive frame may only include a portion of changed or additional material, as in the case of adding an element to a bullet list. Therefore, the wireless link 20 need not support the full bandwidth capability of the VGA connection designed to support real-time video, typically 75 Hz. Accordingly, the display sequencer 42 only transmits a new frame or portion of a frame when the frame analyzer 52 determines that there has been a salient change in the frame being received over the VGA connection 38 as compared to the frame currently held in buffer 50 (and being displayed/output by presentation server 12).

The frame analyzer 52 examines the display information being sent over the VGA connection 38 to determine when a new frame transmission to the presentation server 12 needs to occur. When the frame analyzer 52 determines that the display information reaches a threshold of new information, such as the addition of a bullet element, the display sequencer 42 transmits a new frame to the presentation server 12. The use of a threshold avoids successive triggering of new frame transmissions for trivial items such as time, cursor position, and animated icons such as web search indicators, which often accompany a standard VGA output display. In this manner, the current frame from the media source 14 is maintained in the frame buffer 50, and only transmitted over the wireless link 20 to the presentation server 12 when the frame actually changes.

Figure 4A:
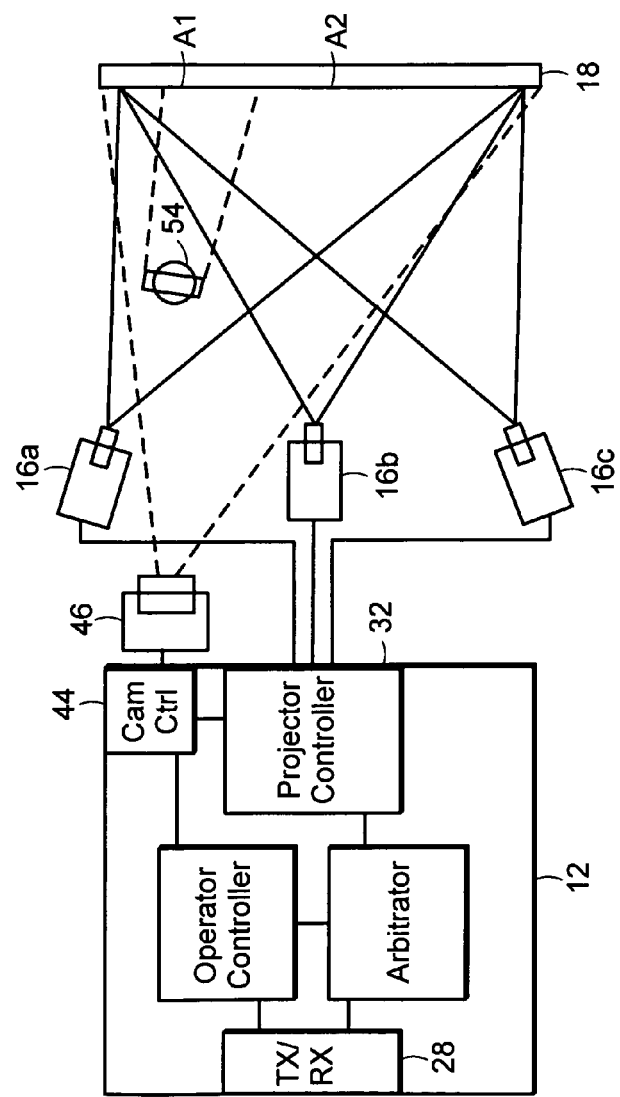
FIGS. 4a and 4b are illustrations of the shadow elimination processing of the presentation system invention.
Figure 4B:
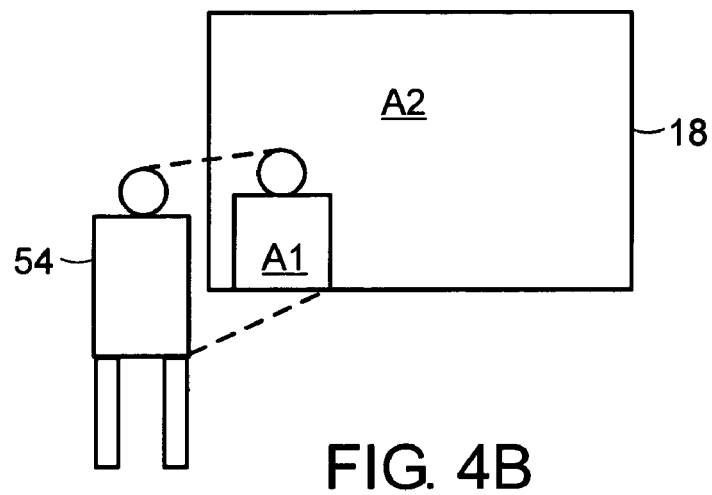

FIGS. 4a and 4b illustrate shadow correction and elimination in the presentation system 10. Referring to FIGS. 4a and 4b, the presentation server 12 is employing three projectors 16a–16c. A presenter 54 steps in front of and partially obscures the image being transmitted from projector 16a. Projectors 16b and 16c remain unobscured as indicated by the dashed view lines in FIG. 4a. As a result of the foregoing, an area Al is obscured on the common display 18 in the transmission from projector 16a. Area A2 remains unobscured.

The camera 46 receives (captures) the obscured image and transmits to the camera controller 44. The camera controller 44 computes the pixels comprising areas A1 and A2 on the common display 18. The projector controller 32 directs the projectors 16b and 16c to increase the intensity of the pixels corresponding to area Al by 50% each, to compensate for the loss of contribution from projector 16a and ultimately maintain the total brightness. Pixels corresponding to area A2 are maintained, as shown in Table I.

TABLE I

| Projector | Area A1 | Area A2 |
|---|---|---|
| 16a | Off | Maintain |
| 16b | +50% | Maintain |
| 16c | +50% | Maintain |

Therefore, the total intensity of the transmission to both areas A1 and A2 remains consistent, avoiding displaying the shadow obstruction of the presenter 54. The projector controller 32 may also direct projector 16a to turn off pixels corresponding to area A1, since these are not contributing and may serve to blind the presenter 54. As the presenter 54 moves about and causes various other obstructions in the displayed image, the camera 46, camera controller 44 and projector controller 32 continuously detect and correct for such in the manner described above.

Figure 5A:
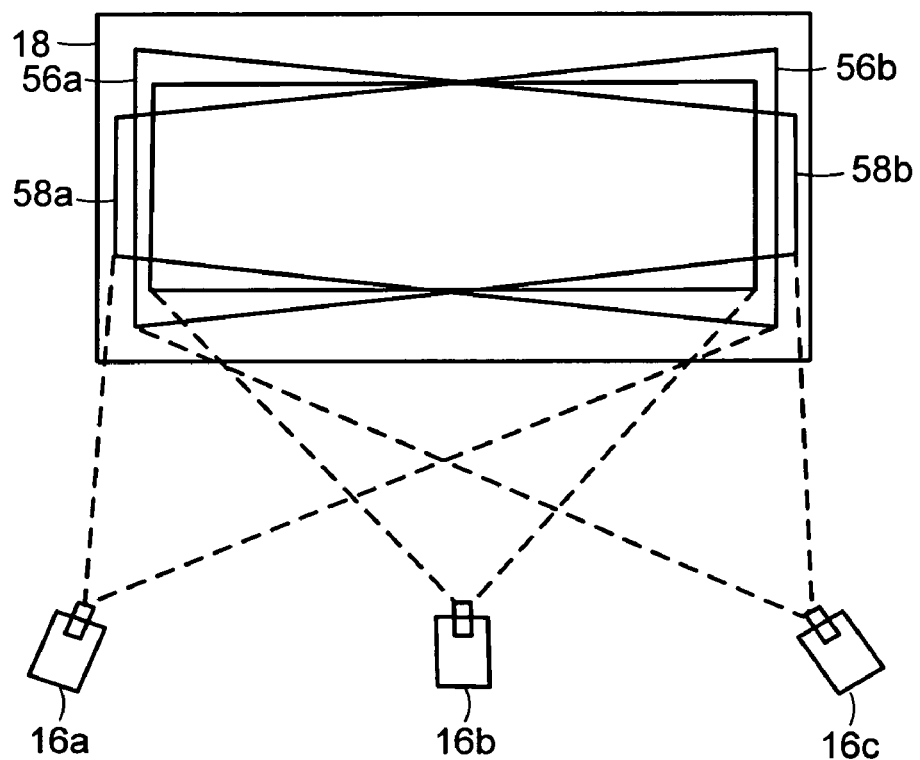
FIGS. 5a and 5b are illustrations of the perspective distortion correction of the presentation system invention.
Figure 5B:
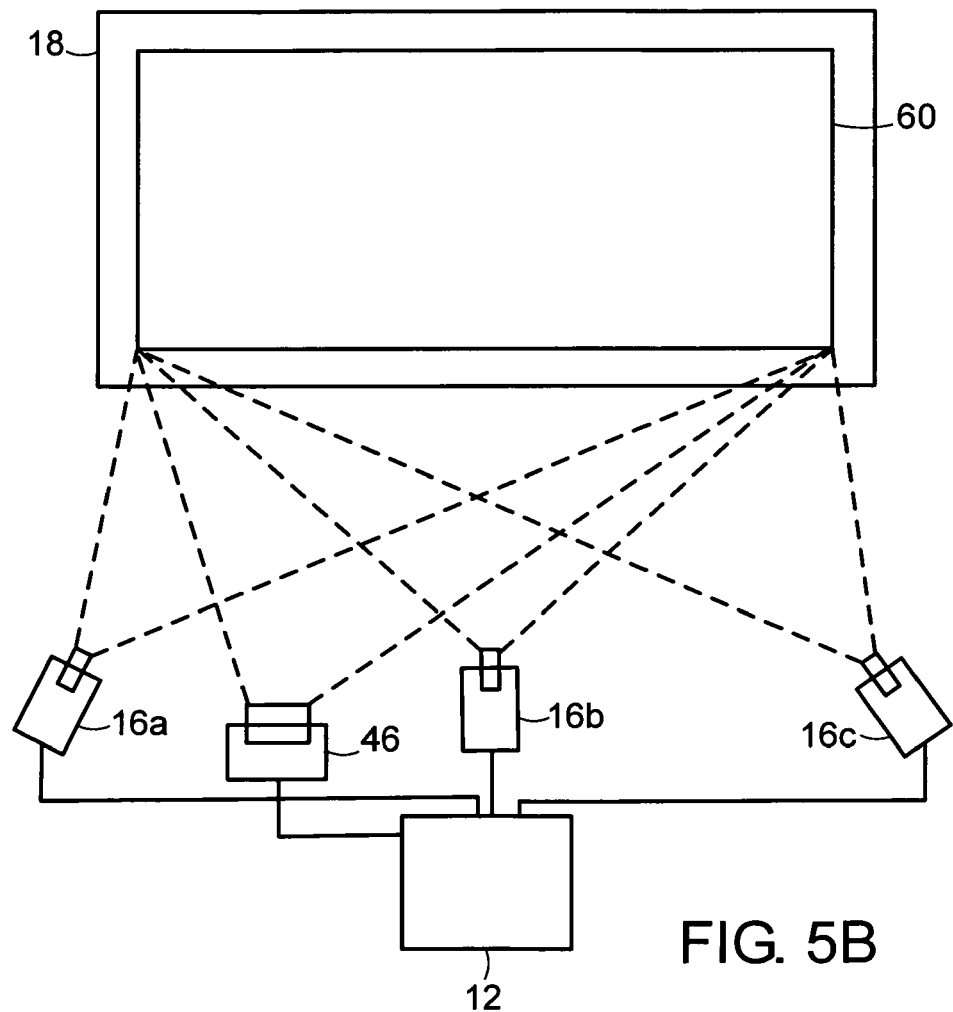

FIGS. 5a and 5b show the perspective distortion correction of the presentation system 10. Referring to FIG. 5a, a plurality of projectors 16a–16c each has a different perspective onto the common display. For example, the vertical edges 56a, 56b farthest from the projector appears longer, or stretched, with respect to the opposite vertical edges 58a, 58b. Similar geometric effects occur with respect to the horizontal orientation. Angle of elevation and distance also affect the display appearance. Display parameters are augmented for each projector 16n so that the aggregate, overlaid image appearing on the common display 18 appears to be from a single source, and not distorted because of the different perspectives of each projector 16n.

FIG. 5b shows the aligned aggregate image 60 on the common display 18. Referring to FIGS. 2 and 5b, the camera 46 provides feedback to the projector controller 32 to compute display parameters for each projector 16a–16c connected to the presentation server 12. In a preferred embodiment, the display parameters represent eight (8) degrees of freedom affecting the displayed image 60. Further, operator input from a laser pointer operated on the display screen 18 or mouse/input device 36' can be used to orient the augmented image in a "click and drag" manner, for example to maximize the size of the image, and recompute the appropriate display parameters. Ideally, each of the projectors 16a–16c contributing to the augmented, overlaid image is aligned to within one (1) pixel so that the displayed image 60 appears consistent to a very fine resolution.

Figure 6:
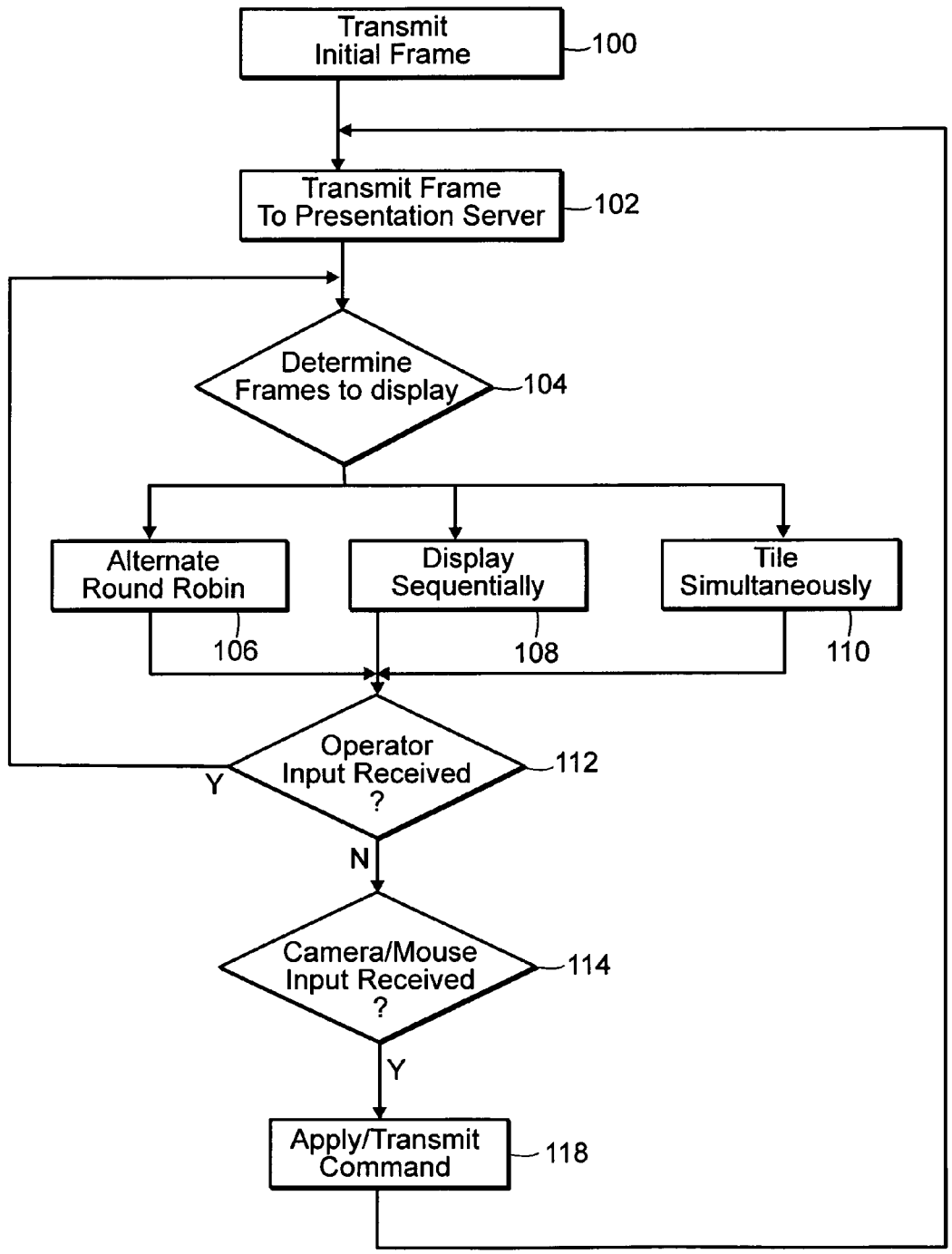
FIG. 6 is a flowchart of the operation and GUI of the presentation system invention of FIG. 2.

FIG. 6 shows a flowchart of the operation and GUI of the present system. Referring to FIGS. 2 and 6, a media source 14 computes and transmits an initial frame of a media sequence to the presentation controller 22, as depicted at step 100. The frame is transmitted to the presentation server 12 by the presentation controller 22, as shown at step 102. The arbitrator 30 in the presentation server 12 determines which frame or frames to display, based on the operator controller 34, as disclosed at step 104. In an exemplary embodiment, the operator controller 34 directs the arbitrator 30 to alternate from among the media sources 14a–14n in a round robin fashion, as shown at step 106. Alternatively, the operator controller 34 may direct the arbitrator 30 to display the media sequence from each media source 14a–14n sequentially in entirety, as shown at step 108, or to tile multiple or all media sequences simultaneously, as shown at step 110. Other aspects and embodiments of GUI based control can be implemented by one of ordinary skill in the art without deviating from the spirit and scope of the present invention, as will be discussed further below.

A check is made to determine if operator input has been received from the operator console 36, as shown at step 112. If a command has been received, control reverts to step 104, as described above. Otherwise, a check is performed to determine if mouse-based input from a mouse/input device 36' or laser pointer has been received from the camera 46, as depicted at step 114. If a command input has been received, then the operator controller 34 evaluates the command to determine whether to direct the arbitrator 30 accordingly and whether the command is to be transmitted back to the affected media source or sources 14n, as shown at step 118. Such commands may be, for example, an instruction to advance the media sequence by a frame. Control then reverts to step 102 to await the next transmitted frame.

Figure 7:
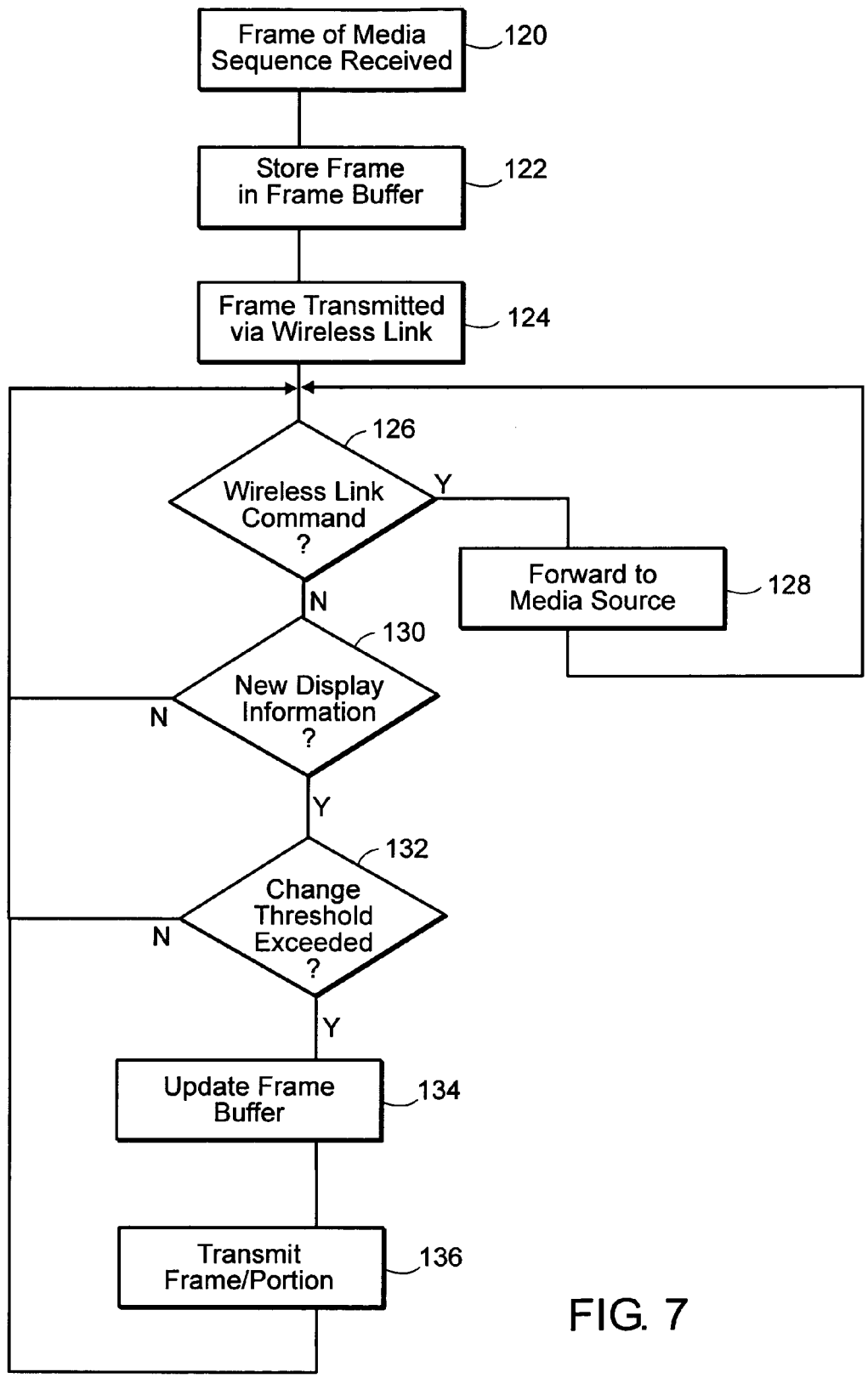
FIG. 7 is a flowchart of the operation of the wireless interface of the presentation system invention of FIG. 3.

FIG. 7 shows a flowchart of the wireless interface operation. Referring to FIGS. 3 and 7, a frame of the media sequence is received by the presentation controller 22, as depicted at step 120. The presentation controller 22 stores the frame in the frame buffer 50, as shown at step 122. The frame is then transmitted to the presentation server 12 via the wireless link 20, as disclosed at step 124. The wireless link 20 is monitored to detect if commands are received from the presentation server 12, such as commands to advance the sequence one frame, as disclosed at step 126. If a command has been transmitted, then it is forwarded to the media source 14 via the mouse connection 40, as shown at step 128. Otherwise, the frame analyzer 52 then monitors the VGA connection 38 to check if new display information is received, as depicted at step 130. When new display information is received, a check is made to determine if the new information exceeds a change threshold of salient information, as disclosed at step 132. If the new display information is not substantial enough, such as only a time display change, then control reverts to step 126 to wait for another command or display change. If the information received exceeds the threshold, then the frame buffer 50 is updated with the new information, as shown at step 134. The updated frame is then transmitted to the presentation server 12 over the wireless link 20, as shown at step 136. Alternatively, a changed portion of the frame may be sent to further conserve bandwidth. Control then reverts to step 126 for successive commands and display changes.

Figure 8:
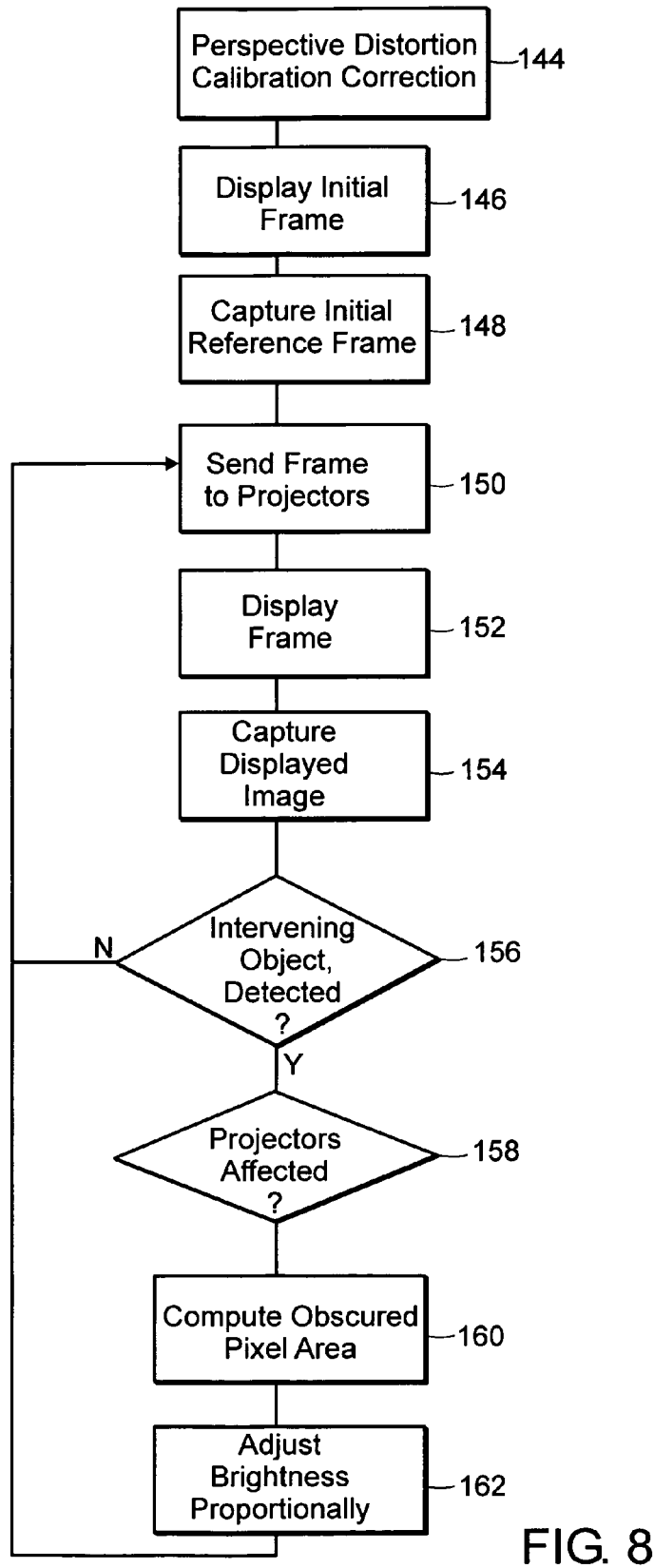
FIG. 8 is a flowchart of the shadow elimination processing of the presentation system invention of FIGS. 4a and 4b.

FIG. 8 is a flowchart of the shadow elimination processing of the presentation system 10. Referring to FIGS. 8, 4a, and 4b, an initialization process includes three steps. Perspective distortion correction calibration is performed, as depicted at step 144. The initial reference frame is then displayed, as disclosed at step 146. An initial display reference image is captured, as shown at step 148. The projector controller 32 then sends a frame to each of the projectors 16a–16c, as shown at step 150. The projectors 16a–16c each display the frame onto the display medium 18, as shown at step 152. The camera 46 captures the displayed image as a reference image and sends it to the camera controller 44, as depicted at step 154. A check is performed to determine if the camera detects an intervening object, such as the presenter 54, as disclosed at step 156. If an obstructed area caused by an intervening object is detected, then a check is performed to determine which projector or projectors 16 are affected by the intervening object, as disclosed at step 158. The affected projectors 16a–16c can be determined either by multiple cameras 46 co-located with the projectors 16, or by adjusting the brightness of all projectors 16 to determine which display areas are not affected. The obscured pixel area is then computed, as disclosed at step 160, and the brightness of the unobstructed projectors 16n adjusted proportionally to compensate for the shaded area (obstructed) on the common display 18, as depicted at step 162. The obscured pixel area is computed by comparing the current image to the reference image captured by the camera 46 at step 154. Control then reverts to step 150 to check for additional intervening objects or effective removal of the current intervening object 54.

Figure 9:
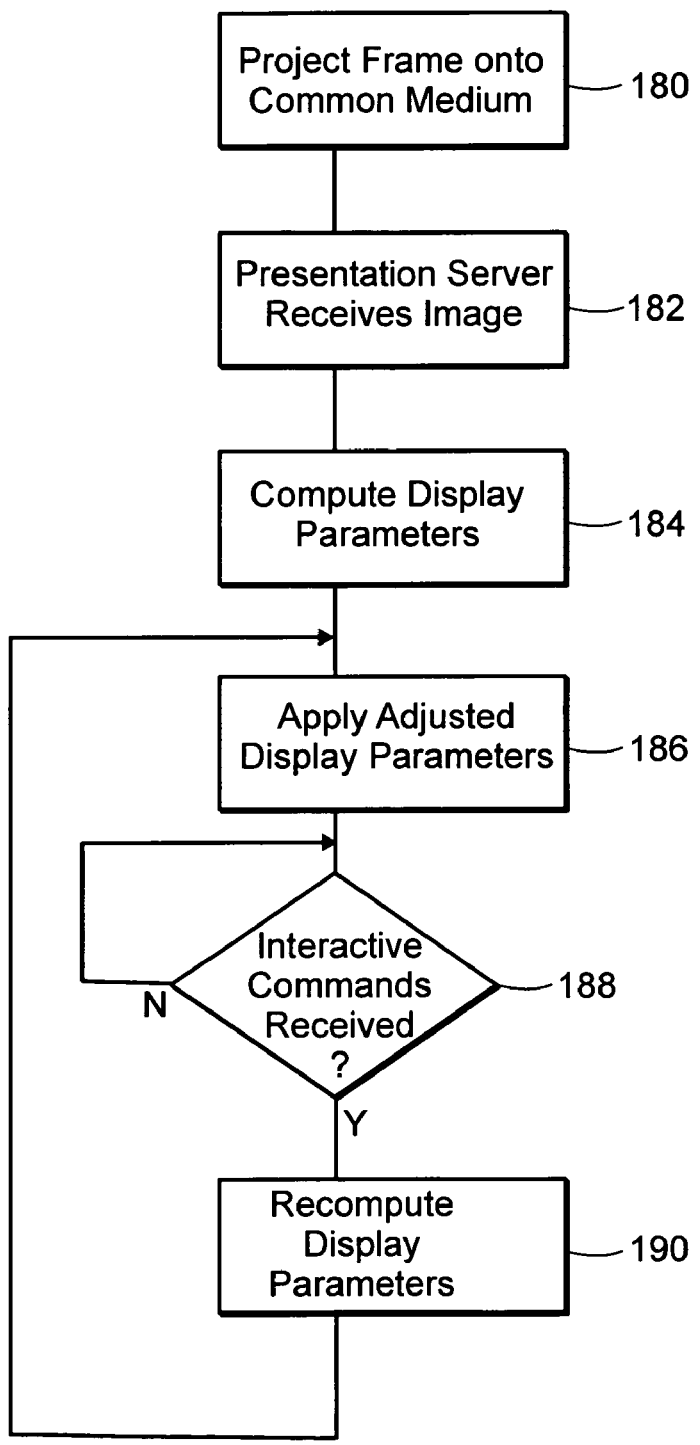
FIG. 9 is a flowchart of the perspective distortion correction processing of the presentation system invention of FIGS. 5a and 5b.

FIG. 9 shows dynamic perspective distortion correction processing of the presentation system 10. As indicated above, multiple projectors 16 each project from a different perspective onto the common display 18. Referring to FIGS. 9, 5a, and 5b, the projectors 16a–16c each project the frame onto the common display medium 18, as shown at step 180. The camera 46 receives the image from the common display 18 and sends it to the presentation server 12, as disclosed at step 182. For each projector 16, the display parameters are computed to be consistent with a unified, augmented image 60 on the common display 18, as depicted at step 184. The augmented display parameters are applied to stretch or contract the horizontal and vertical axes, and to enlarge or reduce to compensate for overall size of the image on the common display 18, as shown at step 186. Such display parameters include pre-warping transformations, such as corner manipulations, and may include others. A check is performed to poll for interactive commands affecting the display, such as a click and drag command to move or stretch the display, as shown at step 188. An interactive command may be received, for example, from a laser pointer, mouse click, or operator console 36. If an interactive command is received, the display parameters are recomputed for each projector 16, as shown at step 190. Control then reverts to step 186 for the adjusted display parameters to be applied. The system then waits for another interactive command to be received, as shown st step 188, and the unified, aggregate display from all of the projectors 16 continues to be shown on the common display medium 18 at the current display parameter values.

Example algorithms for calculating occluded pixels (for obstruction correction in FIG. 8 or image distortion correction) are found in Sukthankar, R, Cham, T., Sukthankar, G., and Rehg, J, "Dynamic Shadow Elimination for Multi-Projector Displays," Proceedings of Computer Vision and Pattern Recognition, IEEE Computer Society, December, 2001, incorporated herein by reference.

The system and GUI as described above may be modified for a particular user-specific implementation based on user requirements, as will be apparent to those skilled in the art, without deviating from the spirit and scope of the invention. In a particular embodiment, for example, the user experiences with the system will appear as follows. Each meeting room will be equipped with a presentation server 12, managing either front- or rear-mounted projectors 16 that have been instrumented with the latest version of any presentation enhancement software. Software upgrades will be handled by administrators of the server, freeing the users from the tedious task of dealing with software versioning problems and incompatibilities. Files need not be transferred from the media sources 14 to the presentation server 12; hence the system will be protected from any viruses and Trojan horses attached to guests' files and floppy disks.

When a speaker enters the room, they will be equipped with a hardware presentation controller 22 that attaches to the video output and mouse input of the speaker's media source 14. The presentation server 12 will be managed with a remote control with sufficient functionality for performing basic tasks, such as switching the input from one user to another, splitting the screen 18 between multiple users, and enabling or deactivating software features. For doing more complicated tasks, a more detailed web-based interface, requiring password authentication, will allow a user to modify calibration settings, reset the server, download software upgrades, and other operations.

In a typical session, there will be several guests using laptops 14 with attached presentation controllers 22 and pointing devices. An operator, or moderator, will use the remote control with a menu interface to switch the outputs from one speaker to another and make minor modifications during the presentation. The entire system is designed to provide a seamless presentation experience without the inconvenient blackout periods caused by users detaching and reconnecting cables, rebooting their computers, etc. Using the presentation server 12, the moderator will always be able to shift the display to an alternate presentation and compensate for environmental disturbances to keep the schedule moving smoothly along.

It will be apparent to those skilled in the art that the various computing platforms as disclosed herein, such as the presentation server and presentation controller, could be implemented by a variety of interconnected microprocessor-based elements. For example, the presentation server could be implemented by a plurality of computers on a LAN, or a single computer having multiple parallel processors. The presentation controller, similarly, could be implemented by a variety of microprocessor based configurations. Such a presentation controller may be operable to connect to multiple media sources. Other internetworking options are available and known to those skilled in the art.

Those skilled in the art should readily appreciate that the programs for implementing a multiple user multi-projector system as defined herein are deliverable to a computer in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While this invention has been particularly shown and described with references to preferred embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A system for integrating and coordinating a plurality of media presentation displays comprising:
   at least one media source having a media sequence;
   for each media source, a presentation controller responsive to the media source, and connected via a video output port to receive the media sequence from the media source, the presentation controller being operable for wireless communication;
   a presentation server operable for wireless communication with each presentation controller such that the presentation server receives the media sequences of each media source, the presentation server comprising an arbitrator responsive to each presentation controller and operable to selectively display the media sequences from the media sources sequentially or simultaneously; and
   at least one media presentation display connected to the presentation server, each presentation display being responsive to the presentation server and operable to display the media sequence of the media sources.

2. The system of claim 1 wherein the presentation controller further comprises a display sequencer operable to receive each of the media sequences from the media sources.

3. The system of claim 2 further comprising an operator controller in communication with the display sequencer and the arbitrator and operable to select media sequences and portions of media sequences for display through each media presentation display.

4. The system of claim 1 wherein the display sequencer is operable to selectively transmit changed portions of a displayed media sequence.

5. The system of claim 1 wherein the presentation server is operable to receive only those portions of a displayed media sequence which have changed.

6. The system of claim 1 wherein the at least one media presentation display comprises a plurality of projectors.

7. The system of claim 6 wherein the presentation server further comprises a projector controller operable to augment a displayed media sequence from each of the projectors.

8. The system of claim 1 further comprising a camera operable to capture signals from the displayed media sequence, the camera being in communication with the presentation server.

9. The system of claim 8 wherein the media source is responsive to the presentation server, the presentation server directing the media source in response to the captured camera signals.

10. The system of claim 1 wherein the media source is connected to the presentation controller via a video output port operable to transmit the media sequence.

11. The system of claim 1 wherein the media source is connected to the presentation controller via a mouse input port operable to receive signals from the presentation server.

12. The system of claim 1 wherein the media source is a handheld personal computing device.

13. A method of transmitting presentation data from a media source to a media presenter comprising:
   establishing a wireless link between the media source and the media presenter, the media source having a media sequence comprising frames;
   transmitting at least one frame from the media source to the media presenter;
   rendering a displayed image by the media presenter on a common medium based on the transmitted frame;
   selectively arbitrating among media sequences transmitted from each of a plurality of media sources; and
   selectively transmitting at least a portion of a subsequent frame in the media sequence from the media source to the media presenter when a measurable difference in images from one frame to another frame is detected in the media sequence.

14. The method of claim 13 wherein the media presenter is operable to change the displayed image according to a predetermined threshold of differences between the displayed image and image of the subsequent frame in the media sequence.

15. The method of claim 13 further comprising:
   capturing the displayed image from the common medium at the media presenter; and
   reading control parameters from the displayed image.

16. The method of claim 15 wherein the control parameters are indicative of which of the media sources to display.

17. The method of claim 13 wherein the transmitting from the media source to the media presenter is performed according to a predetermined protocol.

18. The method of claim 17 wherein the predetermined protocol is IEEE 802.15.

19. The method of claim 13 further comprising arbitrating by the media presenter.

20. The method of claim 13 wherein establishing includes providing a presentation server as the media presenter, the presentation server being in wireless communication with each of a plurality of media sources.

21. A computer program product having computer program code for transmitting presentation data from a media source to a media presenter comprising:
   computer program code for establishing a wireless link between the media source and the media presenter, the media source having a media sequence comprising frames;
   computer program code for transmitting at least one frame from the media source to the media presenter;
   computer program code for rendering a displayed image by the media presenter on a common medium based on the transmitted frame;
   computer program code for selectively arbitrating among media sequences transmitted from each of a plurality of media sources; and
   computer program code for selectively transmitting at least a portion of a subsequent frame in the media sequence from the media source to the media presenter when a measurable difference in images from one frame to another frame is detected in the media sequence.

22. A computer data signal including program code for transmitting presentation data from a media source to a media presenter comprising:
   program code for establishing a wireless link between the media source and the media presenter, the media source having a media sequence comprising frames;
   program code for transmitting at least one frame from the media source to the media presenter;

program code for rendering a displayed image by the media presenter on a common medium based on the transmitted frame;

program code for selectively arbitrating among media sequences transmitted from each of a plurality of media sources; and program code for selectively transmitting at least a portion of a subsequent frame in the media sequence from the media source to the media presenter when a measurable difference in images from one frame to another frame is detected in the media sequence.

23. A system for integrating and coordinating a plurality of media presentation displays comprising:

means for establishing a wireless link between the media source and the media presentation display, the media source having a media sequence comprising frames;

means for transmitting at least one frame from the media source to the media presentation display;

means for rendering a displayed image by the media presentation display on a common medium based on the transmitted frame;

means for selectively arbitrating among media sequences transmitted from each of a plurality of media sources; and means for selectively transmitting at least a portion of a subsequent frame in the media sequence from the media source to the media presentation display when a measurable difference in images from one frame to another frame is detected in the media sequence.

* * * * *